(12) United States Patent
Lipa et al.

(10) Patent No.: US 9,375,756 B2
(45) Date of Patent: Jun. 28, 2016

(54) POLYURETHANE VIBRATORY SCREEN

(71) Applicant: Derrick Corporation, Buffalo, NY (US)

(72) Inventors: Anthony J. Lipa, Willamsville, NY (US); James R. Colgrove, East Aurora, NY (US)

(73) Assignee: Derrick Corporation, Buffalo, NY (US)

( * ) Notice: Subject to any disclaimer, the term of this patent is extended or adjusted under 35 U.S.C. 154(b) by 0 days.

(21) Appl. No.: 14/663,030

(22) Filed: Mar. 19, 2015

(65) Prior Publication Data

US 2015/0190847 A1 Jul. 9, 2015

Related U.S. Application Data

(63) Continuation-in-part of application No. 13/838,968, filed on Mar. 15, 2013, now Pat. No. 9,010,539, which is a continuation-in-part of application No. 12/763,046, filed on Apr. 19, 2010, now Pat. No. 8,584,866.

(51) Int. Cl.
| | |
|---|---|
| *B07B 1/46* | (2006.01) |
| *B29C 41/36* | (2006.01) |
| *B29K 75/00* | (2006.01) |
| *B29L 31/14* | (2006.01) |

(52) U.S. Cl.
CPC ............ *B07B 1/4609* (2013.01); *B07B 1/4618* (2013.01); *B07B 1/4681* (2013.01); *B29C 41/36* (2013.01); *B29K 2075/00* (2013.01); *B29K 2277/10* (2013.01); *B29L 2031/14* (2013.01)

(58) Field of Classification Search
CPC .... B07B 1/4609; B07B 1/4618; B07B 1/4681
USPC ............................ 209/392, 393, 397, 399, 405
See application file for complete search history.

(56) References Cited

U.S. PATENT DOCUMENTS

| | | | | |
|---|---|---|---|---|
| 4,100,248 A | * | 7/1978 | Adams | B01D 29/012 162/903 |
| 4,383,919 A | * | 5/1983 | Schmidt | B07B 1/4645 209/399 |
| 4,819,809 A | * | 4/1989 | Derrick | B07B 1/4609 209/275 |
| 4,857,176 A | * | 8/1989 | Derrick | B07B 1/48 209/392 |
| 5,385,669 A | * | 1/1995 | Leone, Sr. | B01D 29/012 209/319 |
| 5,876,552 A | * | 3/1999 | Bakula | B01D 29/012 156/208 |
| 7,000,777 B2 | * | 2/2006 | Adams | B01D 29/012 209/399 |
| 7,484,625 B2 | * | 2/2009 | Scott | B01D 33/0376 209/404 |

* cited by examiner

*Primary Examiner* — Terrell Matthews
(74) *Attorney, Agent, or Firm* — Jason P. Mueller; Adams and Reese LLP

(57) ABSTRACT

A molded polyurethane vibratory screen including a body having opposite side edge portions, upper and lower edge portions, an upper surface and a lower surface, first members extending between the side edge portions and the second members extending between the lower edge portion and the upper edge portion, third members substantially parallel and extending transversely between the side edge portions and having multiple first members therebetween, the fourth members substantially parallel and extending transversely between the lower edge portion and the upper edge portion and having multiple second members therebetween, reinforcement members molded integrally with the third and fourth members.

40 Claims, 14 Drawing Sheets

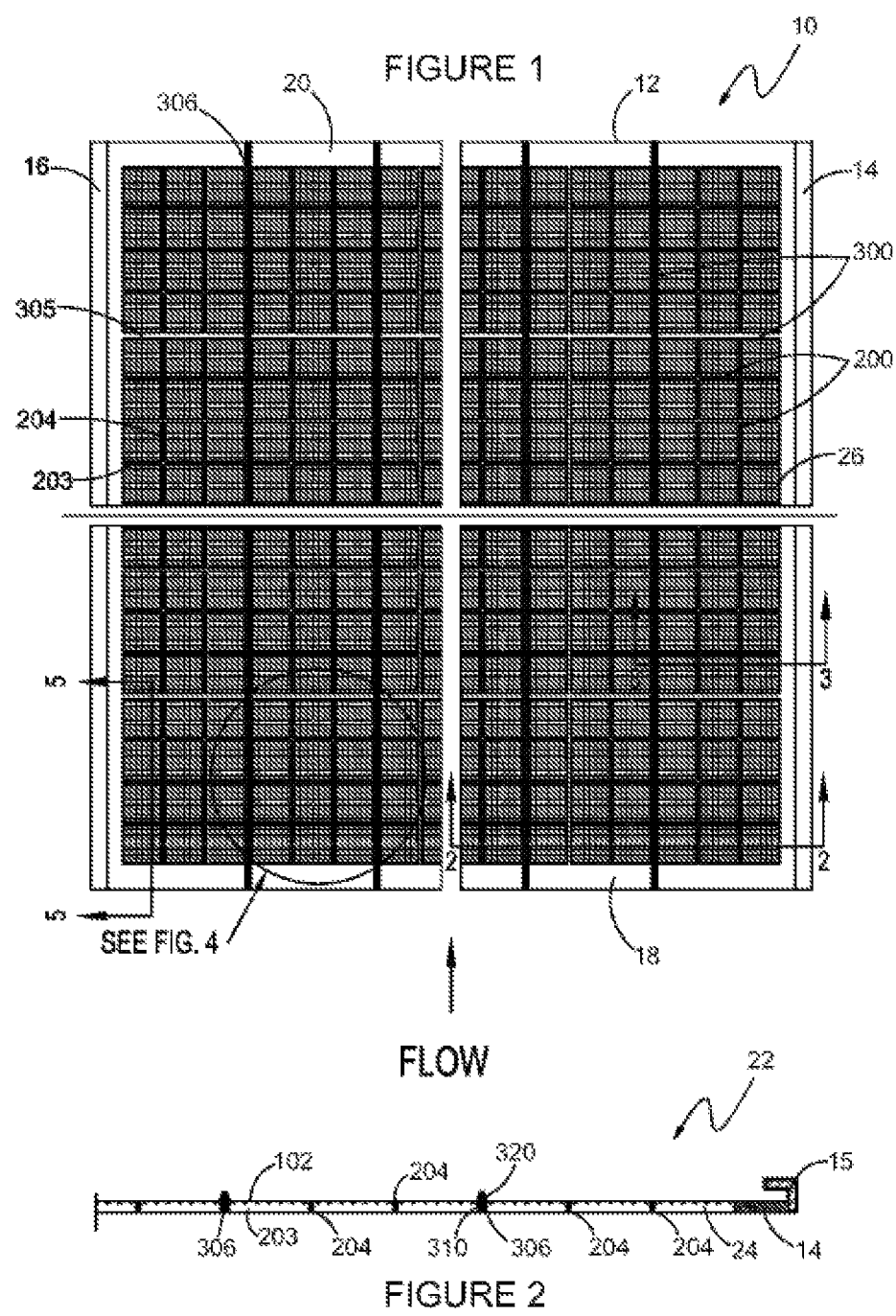

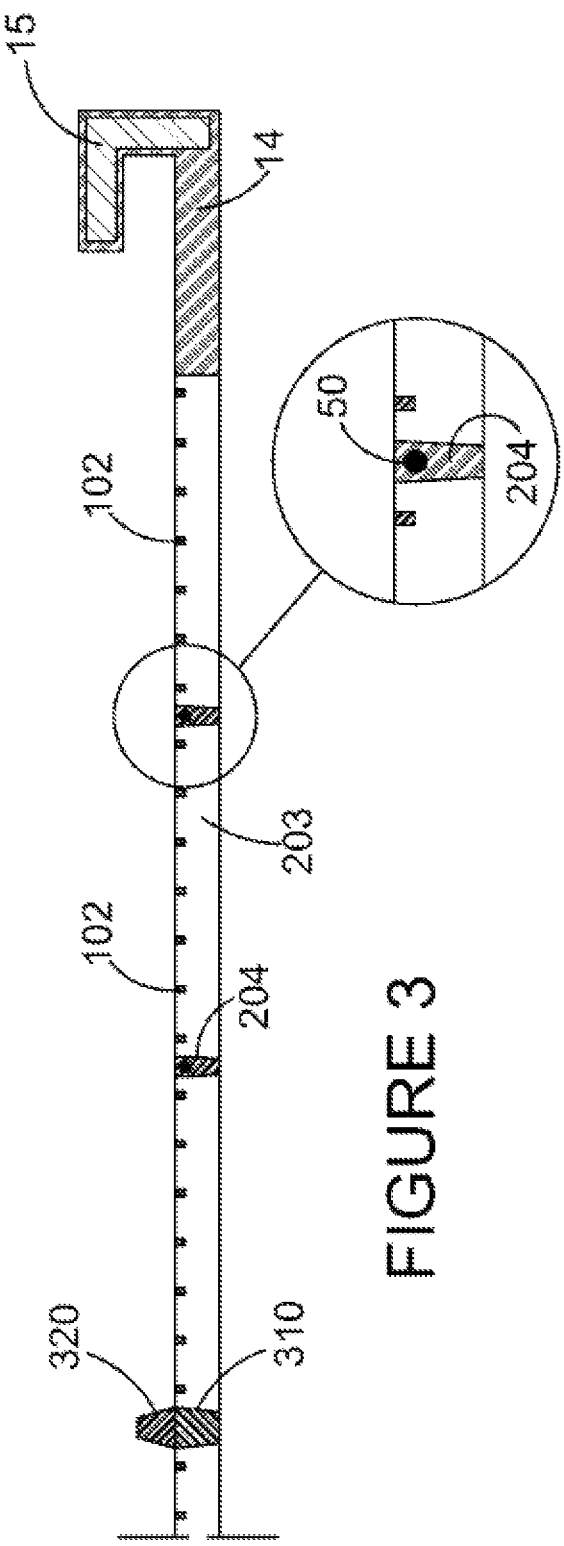

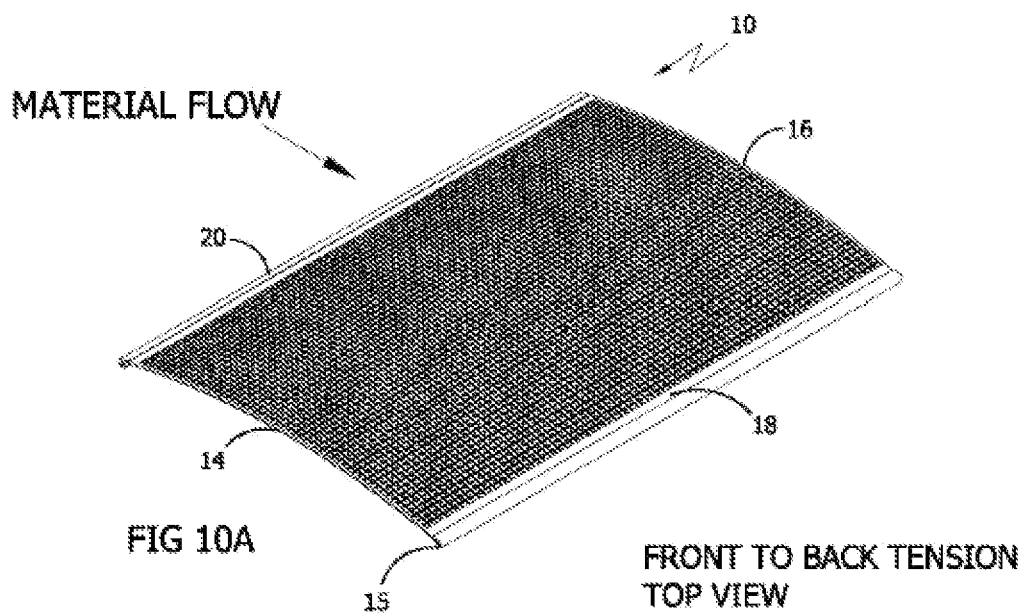
FIG 10A  FRONT TO BACK TENSION TOP VIEW
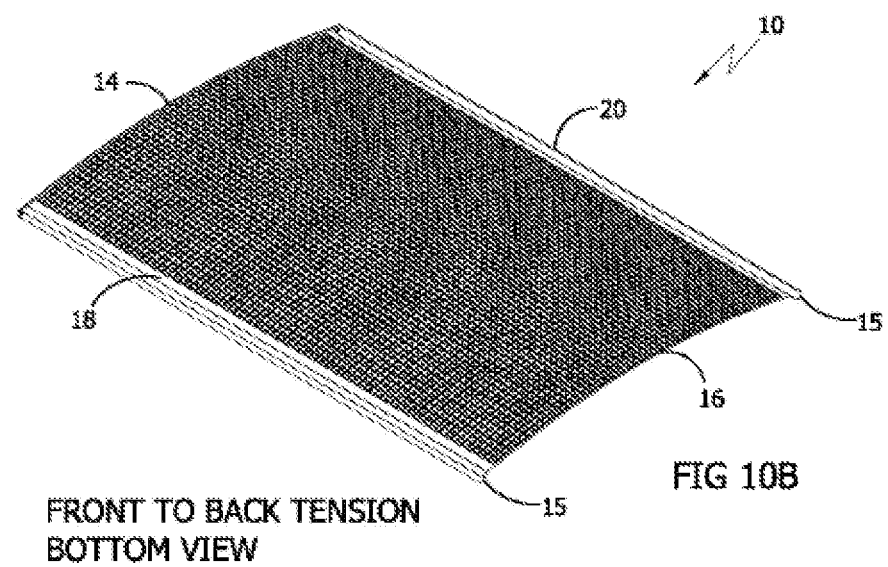
FRONT TO BACK TENSION BOTTOM VIEW  FIG 10B

FRONT TO BACK
W/ REINFORCEMENT RODS

Screen Frame
w/ Side to Side Panel

POLYURETHANE VIBRATORY SCREEN

CROSS-REFERENCE TO RELATED APPLICATIONS

The present disclosure is a continuation-in-part of U.S. patent application Ser. No. 13/838,968, entitled "Polyurethane Vibratory Screen," filed on Mar. 15, 2013, which is a continuation-in-part of U.S. patent application Ser. No. 12/763,046, now U.S. Pat. No. 8,584,866, filed Apr. 19, 2010, both of which are expressly incorporated herein in their entirety by reference hereto.

FIELD OF THE INVENTION

The present invention relates to an improved molded polyurethane screen.

BACKGROUND

Molded polyurethane screens having reinforcement therein are known in the art. However, in the past the dividing strips between the openings were relatively large, thereby causing the open area of the screen to be an undesirably low percentage of its surface, thereby in turn causing the screen to be relatively inefficient.

The present invention is an improvement over U.S. Pat. Nos. 4,819,809 and 4,857,176, both of which are expressly incorporated herein by reference hereto. The present invention provides improved screens with relatively high percentage open screening areas and high efficiencies.

SUMMARY

According to an exemplary embodiment of the present invention, a vibratory screen includes: a flexible molded polyurethane body having substantially parallel side edge portions at opposite ends of the body, a lower edge portion substantially perpendicular to the side edge portions, an upper edge portion substantially perpendicular to the side edge portions and opposite the lower edge portion, an upper surface, a lower surface, first and second members forming screening openings and third and fourth members. The first members extend between the side edge portions. The second members extend between the lower edge portion and the upper edge portion. The third and fourth members may have a thickness greater than the first and second members. The third members are substantially parallel and extend transversely between the side edge portions and have multiple first members therebetween. The fourth members are substantially parallel and extend transversely between the lower edge portion and the upper edge portion and have multiple second members therebetween. Reinforcement members are molded integrally with the third and fourth members.

Example embodiments of the present invention are described in more detail below with reference to the appended Figures.

BRIEF DESCRIPTION OF THE DRAWINGS

FIG. 1 is a fragmentary plan view of a vibratory screen according to an exemplary embodiment of the present invention;

FIG. 2 is a fragmentary cross sectional view taken substantially along line 2-2 of FIG. 1;

FIG. 3 is a fragmentary cross sectional view taken substantially along line 3-3 of FIG. 1;

FIG. 3A is an enlarged fragmentary cross sectional view of a portion of the screen shown in FIG. 3;

FIG. 5A is an enlarged fragmentary cross sectional view of a portion of the screen shown in FIG. 5;

FIG. 10A is a top isometric view of a vibratory screen according to an exemplary embodiment of the present invention;

FIG. 10B is a bottom isometric view of the screen shown in FIG. 10A;

DETAILED DESCRIPTION

Figure 1A:
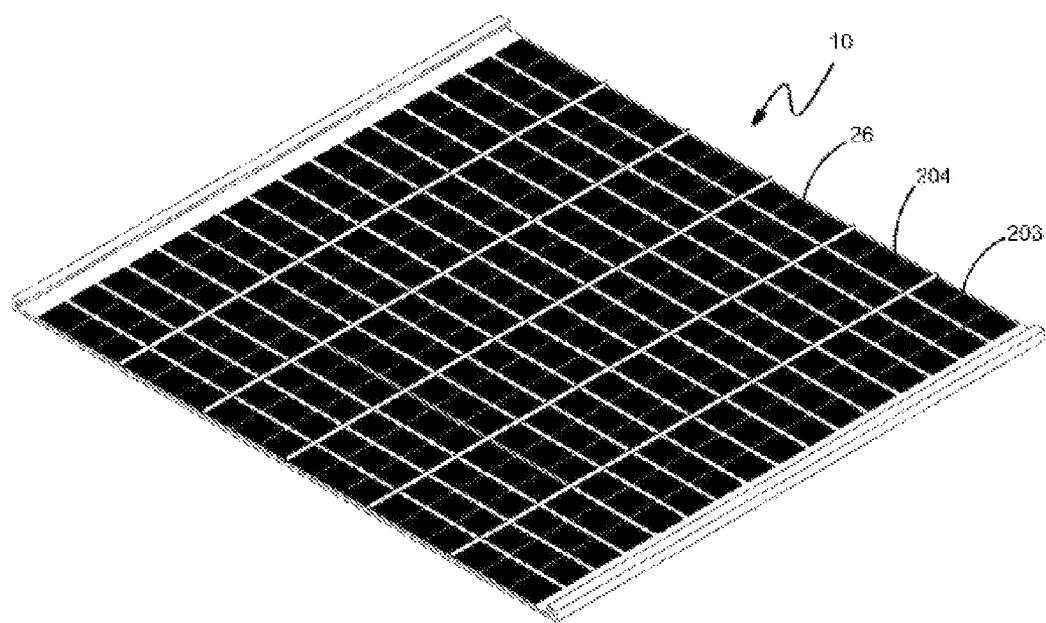
FIG. 1A is a top isometric view of the screen shown in FIG. 1.
Figure 1B:
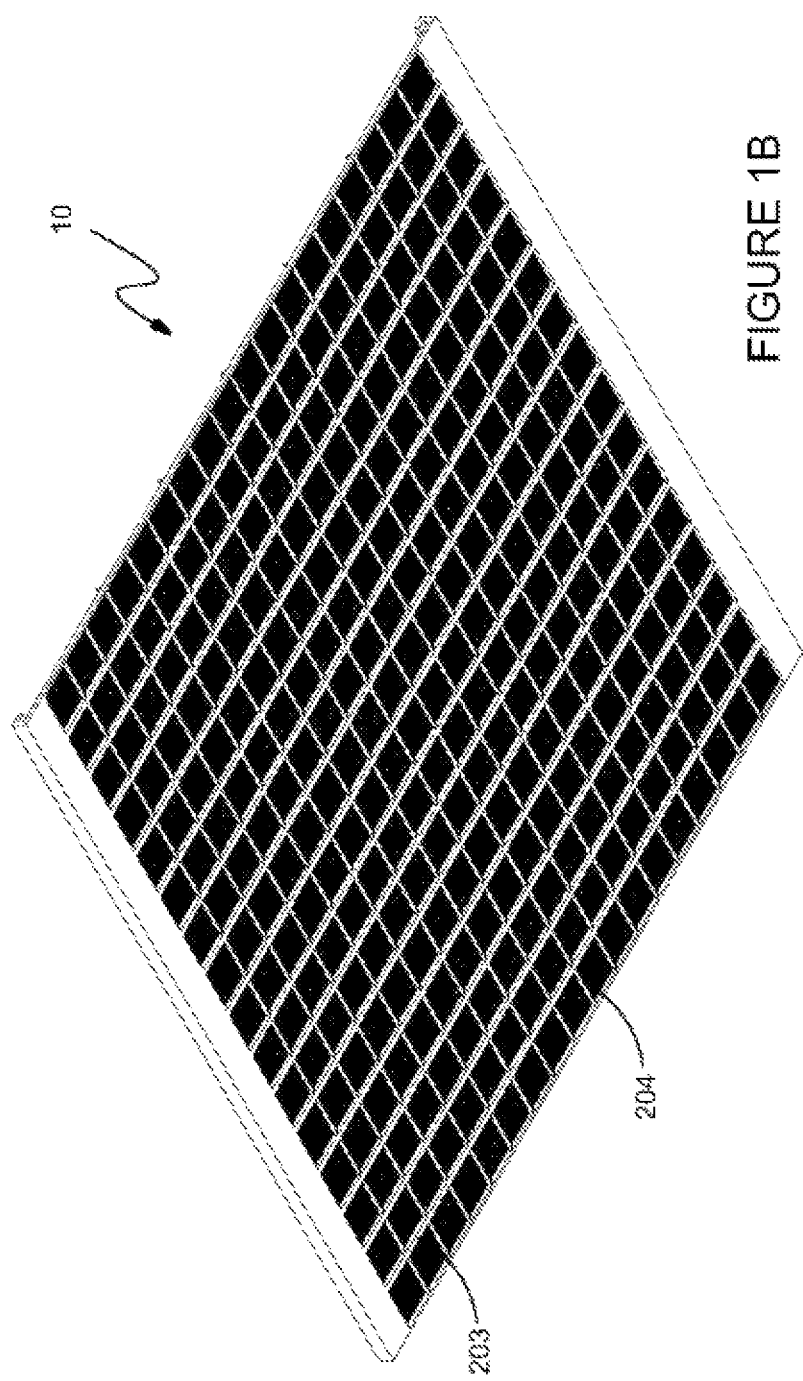
FIG. 1B is a bottom isometric view of the screen shown in FIG. 1.

Like reference characters denote like parts in the several Figures.

Figure 11A:
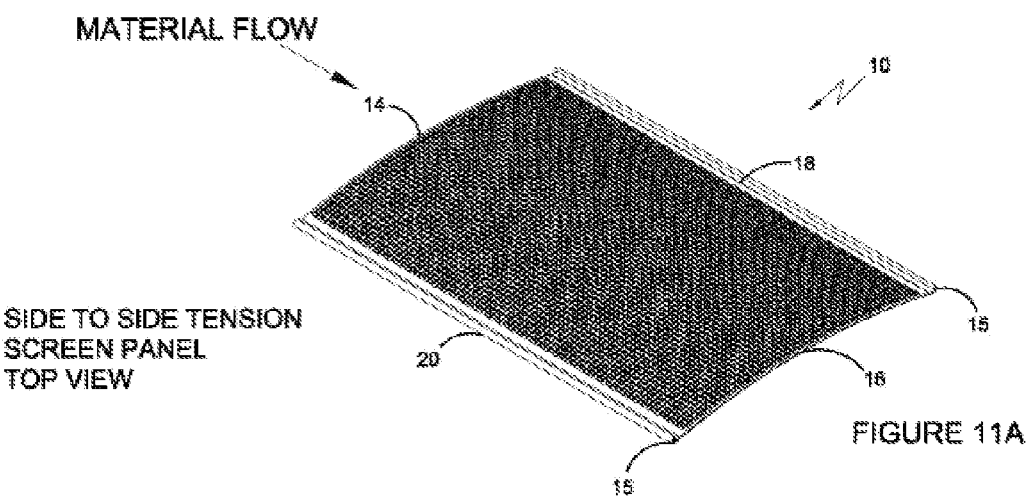
FIG. 11A is a top isometric view of view of a vibratory screen according to an exemplary embodiment of the present invention.
Figure 11B:
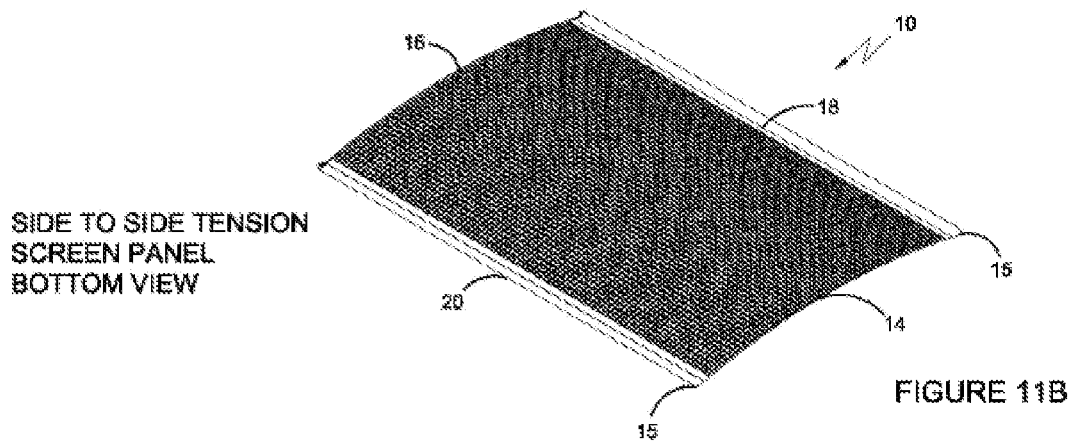
FIG. 11B is a bottom isometric view of the screen shown in FIG. 11A.

According to an exemplary embodiment of the present invention, a vibratory screen 10 includes a body 12 of molded polyurethane having unperforated side edge portions 14, 16. Side edge portions 14, 16 may each have an upward U-shape and may each include a cast-in structural member, such as angle 15 shown in FIG. 2. Side edge portions 14, 16 may also be formed without cast-in structural members and/or may include other structural members. Side edge portions 14, 16 may be formed in a U-shape or any other suitable shape for attachment to a vibratory screening machine. In an exemplary embodiment, side edge portions 14, 16 may include a formed member, e.g., a metal member that is bent to a desired shape, e.g., a U-shape. The formed member may be attached to the polyurethane body by heating, pressing, mechanical, chemical, molding and/or any other suitable method/arrangement. Referring back to the figures, as shown in FIGS. 11A to 11B, angle 15 may form an upward U-shape. Angle 15 may extend the entire length of side edge portions 14, 16. Side edge portions 14, 16 may be configured for mounting vibratory screen 10 in a vibratory screening machine, as is well known. Body 12 also includes a lower edge portion 18 and an upper edge portion 20 which, in combination with side edge portions 14, 16, define an outer border of the screen 10. In certain embodiments, angle 15 may be included in upper edge portion 20 and lower edge portion 18. See, e.g., FIGS. 10A to 10B. In such embodiments, angle 15 may extend the entire length of upper edge portion 20 and lower edge portion 18. In example embodiments, upper edge portion 20 and lower edge portion 18 may be configured for mounting on a vibratory screen 1010 designed for mounting screens front to back. See, e.g., FIG. 13. Body 12 further includes an upper surface 22 and a lower surface 24 and includes first members 101 and second members 102 forming screen openings 26. Body 12 may further include third members 203, fourth members 204, fifth members 305 and sixth members 306. Body 12 may include various configurations of third members 203, fourth members 204, fifth members 305 and/or sixth members 306. The third members 203, fourth members 204, fifth members 305 and/or sixth members 306 may or may not include reinforcement members 50 and are generally configured to provide support to screen openings 26 formed by first and second members 101, 102. Body 12 may include first members 101 and second members 102 without third members 203, fourth members 204, fifth members 305 and/or sixth members 306. The first and/or second members 101, 102 may be configured to include reinforcement members 50. In certain embodiments, reinforcement rods 1050 may be incorporated into members running parallel to the edge portions of the screen having the vibratory machine attachment arrangements (e.g., the edges having the U-shaped structural members discussed herein). See, e.g., FIGS. 12 and 12A. Reinforcement rods 1050 provide stability to screen 10 by preventing the side edge portions, e.g., side edge portions 14, 16 shown in FIGS. 10A, 10B, 11A, 11B, 12 and 12A, from deforming and/or hourglassing. Reinforcement rods do not run perpendicular to the edge portions of the screen having the vibratory machine attachment arrangements as they are substantially rigid, provided for structural support and would generally restrict significant movement or deflection of the screen assembly when a force is applied to the edge portions that interface the vibratory screening machine tensioning members. In an exemplary embodiment, reinforcement rods 1050 may be integrated (including by molding integrally) with fourth members 204 and/or sixth members 306. Reinforcement rods 1050 may be made of plastic, metal, polymer or any other suitable material with the necessary structural properties.

First and second members 101, 102 form a first integrally molded grid structure 100 that defines screen openings 26. Third and fourth members 203, 204 may form a second integrally molded grid structure 200. Reinforcement rods 1050 may be integrally molded into fourth members 204. Fifth and sixth members may form a third integrally molded grid structure 300. Reinforcement rods 1050 may be integrally molded into sixth members 306. As shown in the exemplary embodiment depicted in FIGS. 1, 2, 3, 4 and 5, grid structures 200 and 300 include bi-directional integrally molded reinforcement members forming support grids within the members. Because of the properties of the reinforcement members 50, further discussed herein, and their configuration into a bi-directional grid structure, the members in which the reinforcement members 50 are embedded have a relatively small size and provide for increased open screening area. The grid structures provide screen strength, support for openings 26 during vibratory loading and significantly increase open screening area. Although second and third grid structures are discussed herein, fewer or additional grid structures may be provided.

First members 101 may be substantially parallel to each other and extend transversely between side edge portions 14, 16. The second members 102 may be substantially parallel to each other and extend transversely between the lower edge portion 18 and the upper edge portion 20. Second members 102 may have a thickness greater than the first members to provide additional structural support to screen openings 26.

Figure 9:
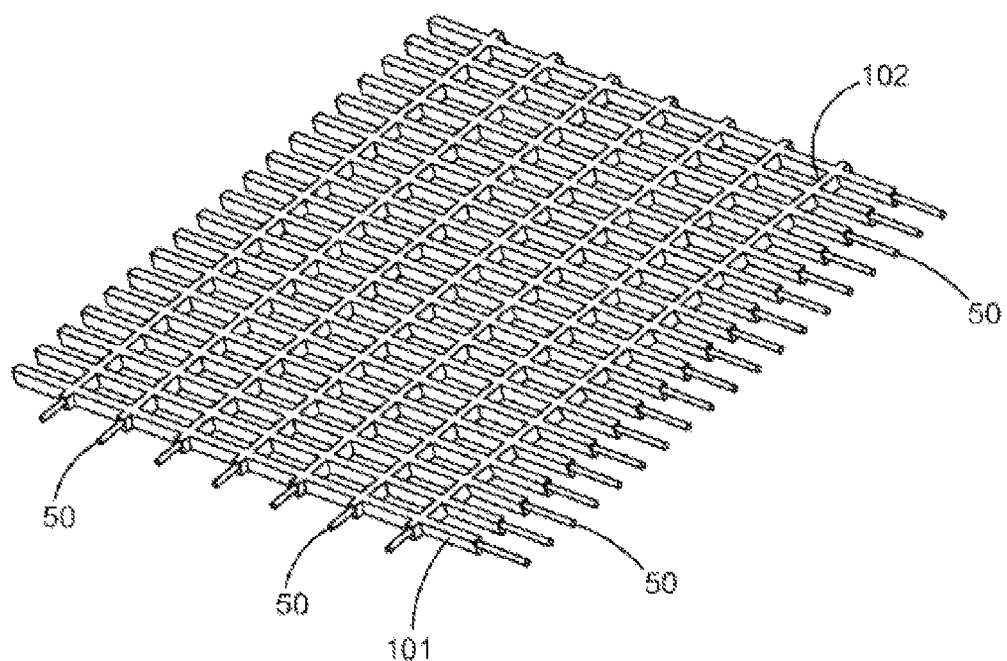
FIG. 9 is an enlarged isometric view of a portion of a vibratory screen according to an exemplary embodiment of the present invention having reinforcement members integral with first and second members forming screen openings.

First members 101 and/or second members 102 may include reinforcement members 50 and may or may not be supported by additional support members or support grid structures. See, e.g., FIGS. 6 and 9. As shown in FIG. 9, body 12 has first and second members 101, 102 with bi-directional reinforcement members 50 molded integrally therewith. The first members include reinforcement members molded integrally therewith, the reinforcement members having a thickness in the range of about 0.006 inches to about 0.015 inches. The second members include reinforcement members molded integrally therewith, the reinforcement members having a thickness in the range of about 0.015 inches to about 0.040 inches. Such configurations may be beneficial for screening applications requiring screens with larger screen openings.

In certain embodiments, reinforcement rods 1050 may be incorporated into at least one of the fourth and sixth members, 204 and 306 respectively and run from edges 14 to 16. See, e.g. FIGS. 12 and 12A. Reinforcement rods 1050 provide stability and prevent hourglassing or other deformation of the screen along the edges of the screen without the U-shape channels, i.e., edges 14 and 16. These embodiments may incorporate reinforcement members 50 in first, second, third, fourth, fifth and/or sixth members 101, 102, 203, 204, 305, 306. Reinforcement members 50 may be incorporated into all or a portion of first, second, third, fourth, fifth and/or sixth members 101, 102, 203, 204, 305, 306. Reinforcement members 50 provide screen properties as discussed herein.

Figures 4, 4A:
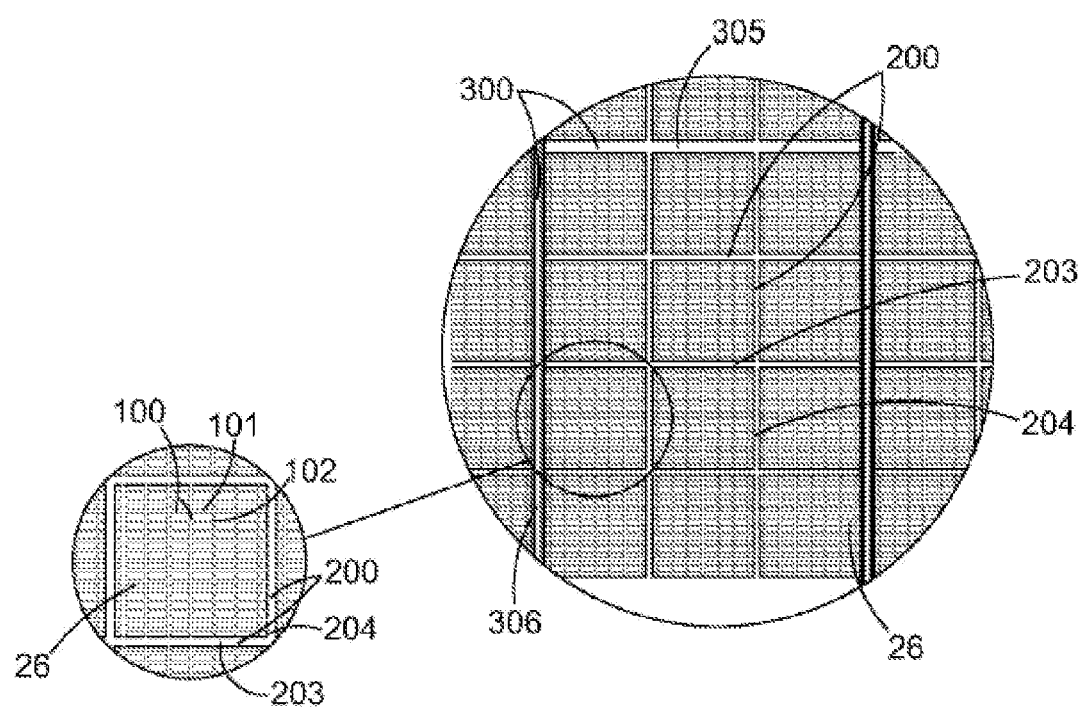
FIG. 4 is a plan view of a portion of the screen shown in FIG. 1.
FIG. 4A is an enlarged plan view of a portion of the screen shown in FIG. 4.
Figure 5:
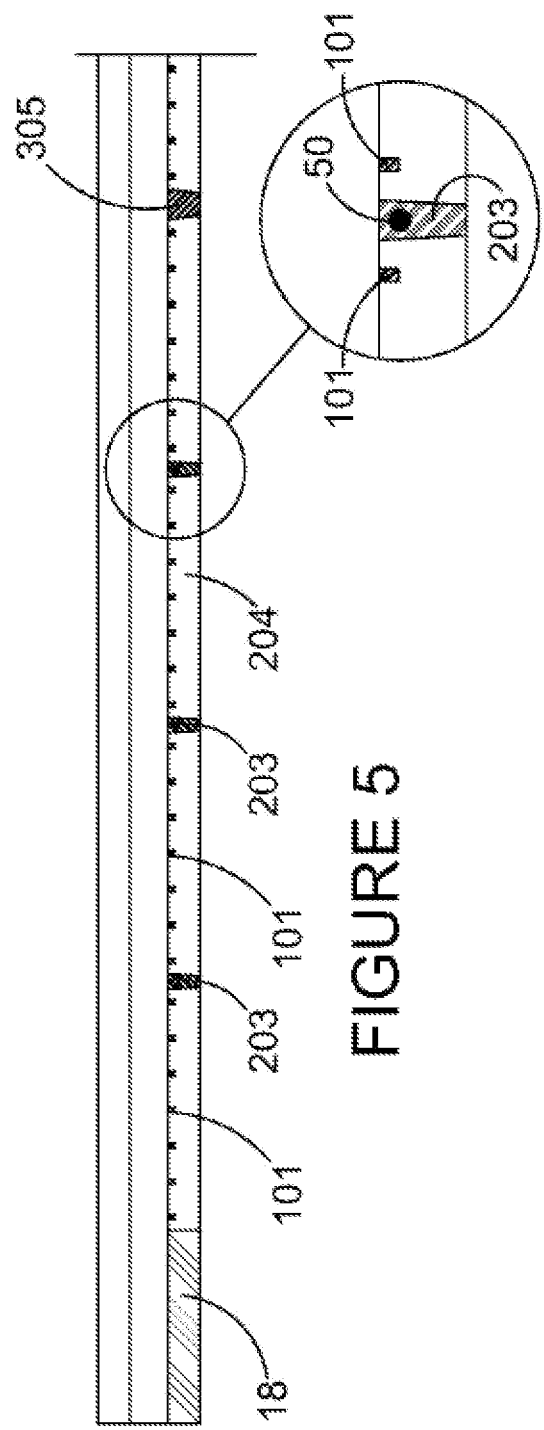
FIG. 5 is a fragmentary cross sectional view taken substantially along line 5-5 of FIG. 1.

As shown in FIG. 4, the screen openings 26 are elongated with a greater length dimension along sides and between ends thereof than width dimensions between the sides and their length dimensions extending in a direction transverse to the side edge portions 14, 16. Screen openings 26 may be about 0.044 mm to about 4 mm in width (i.e., between the inner surfaces of adjacent first members 101) and about 0.044 mm to about 60 mm in length (i.e., between inner surfaces of adjacent second members 102). Screen openings 26 may have a variety of different shapes. For example, the screen openings 26 may have a rectangular shape, a square shape, circular shape and/or any other shape that may be formed by the first and second members 101, 102. The overall dimensions of screen 10 may be about 1.2 meters times 1.6 meters, or any other desired size. All of the dimensions set forth herein are by way of example and not of limitation.

Figure 6:
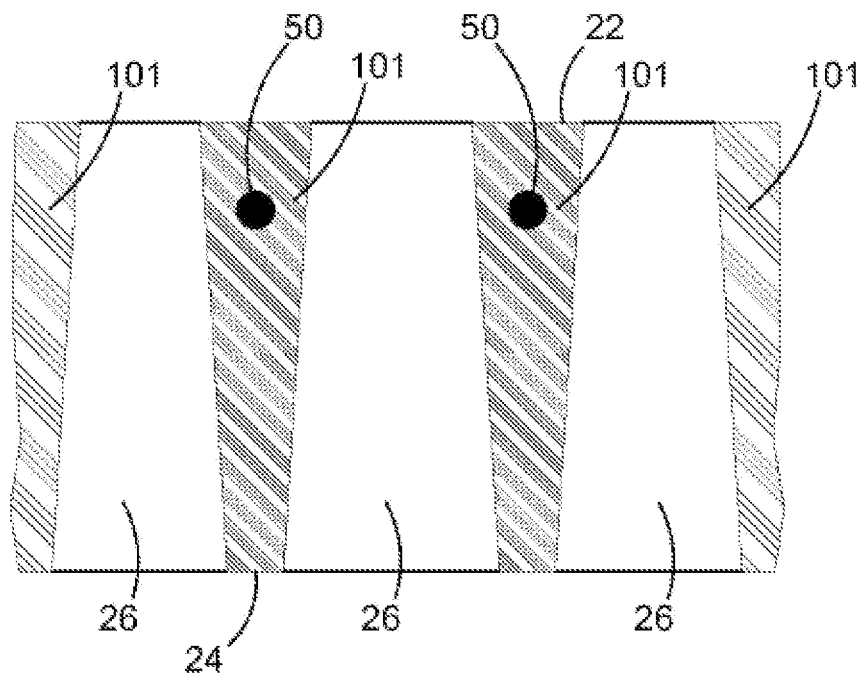
FIG. 6 is an enlarged fragmentary cross sectional view similar to the view taken substantially along line 5-5 of FIG. 5, but showing only a cross section configuration of a modified shape of first members having reinforcement members.
Figure 7:
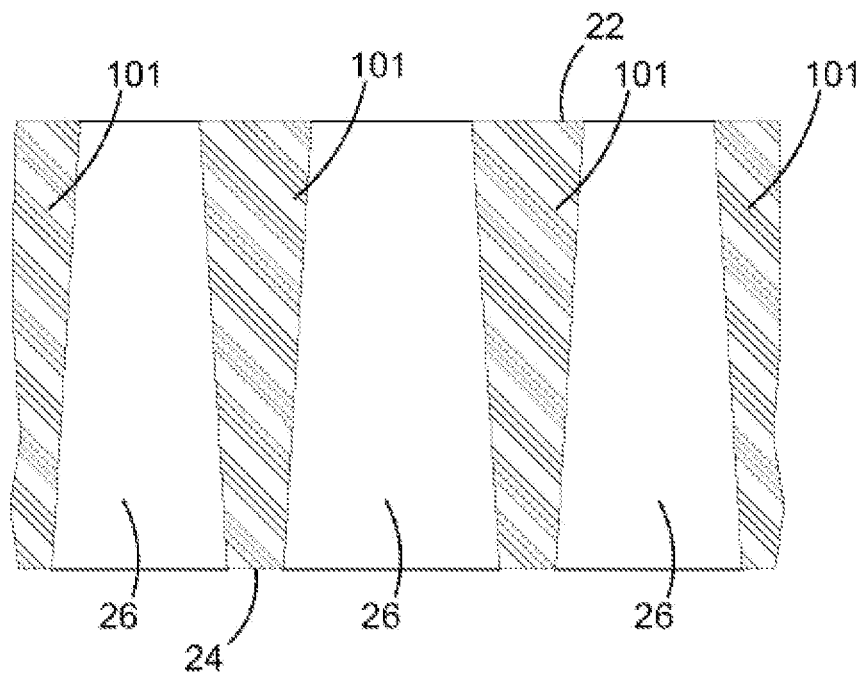
FIG. 7 is a view similar to FIG. 6 but showing first members without reinforcement members.

Screen openings 26 may diverge downwardly between the upper surface 22 and the lower surface 24 and the first members 101 may be substantially in the shape of inverted trapezoids. See, e.g., FIGS. 6 and 7. This general shape of the first members 101 prevents blinding in screens 10. As shown in FIG. 6, first members 101 include reinforcement members 50. As shown in FIG. 7, first members 101 do not include reinforcement members 50.

Screens with the various screen opening sizes and support configurations described herein have a relatively large open screening areas. Open screening areas may range, for example, from between about 40 percent to about 46 percent. As further discussed herein, the relatively large open screening areas may be obtained through the placement of bi-directional reinforcement members 50 in cross members (e.g., members 203, 204) as described in the various embodiments herein. The reinforcement members significantly decrease the size of both of the bi-directional support cross members and allow for a thinner screen members, 101, 102 forming the screen openings 26. The grid work of support members and reinforcement members provide for a structurally sound screen that maintains the necessary screen openings during vibratory operation.

Third and fourth members 203, 204 may have a thickness greater than the first and second members 101, 102. The greater thickness may provide additional structural support to first and second members 101, 102. The third members 203 may be substantially parallel and extend transversely between the side edge portions 14, 16 and may have multiple first members 101 therebetween. The fourth members 204 may be substantially parallel and extend transversely between the lower edge portion 18 and the upper edge portion 20 and having multiple second members 102 therebetween. Fourth members 204 may have reinforcement rods 1050 integrally molded therein. Reinforcement members 50 may be molded integrally with the third and fourth members 203, 204. See, e.g., FIGS. 3A, 5A. Third and fourth members 203, 204 may be configured to have a minimal thickness through inclusion of reinforcement members 50, while providing the necessary structural support to maintain the screen openings 26 formed by first and second members 101, 102 during vibratory screening applications. The bi-direction support system provided by reinforced third and fourth members 203, 204 greatly reduces the thickness of the support members and provides for increased open screening area and overall screen efficiencies. Incorporation of reinforcement rods 1050 into fourth members 204 may adds stability to screen 10 and prevents hourglassing, i.e., deflection inwardly of side edges 14, 16 to give the screen a general hourglass type shape.

Fifth members 305 and sixth members 306 may be included in body 12. Fifth and sixth members may have a thickness greater than the third and fourth members and may have a portion 310 extending downwardly away from the lower surface of the body. The greater thickness and portion extending downwardly may to provide additional structural support to first and second members 101, 102. The sixth members 306 may include a portion 320 extending upwardly away from the upper surface of the body. Portion 320 may be substantially triangular in cross-section with apexes projecting away from the upper surface 22 of body 12. Sixth members 306 are shown in FIG. 2 with portion 320 extending upwardly away from the upper surface of body 12 and acting as flow guides. Sixth members 306 may have reinforcement rods 1050 integrally molded therein. The fifth members 305 may be substantially parallel and extending transversely between the side edge portions 14, 16 and have multiple third members 203 therebetween. The sixth members 306 may be substantially parallel and extending transversely between the lower edge portion 18 and the upper edge portion 20 and have multiple fourth members 204 therebetween. Reinforcement members 50 may be molded integrally with fifth and sixth members 305, 306. Fifth and sixth members 305, 306 may be provided for additional support to screen openings 26 and may be configured to have a minimal thickness through inclusion of reinforcement members 50, while providing the necessary structural support to maintain screen openings 26 during vibratory screening applications. The bi-direction support system provided by reinforced fifth and sixth members 305, 306 greatly reduces the thickness of the support members and provides for increased open screening area and overall screen efficiencies. Incorporation of reinforcement rods 1050 into sixth members 306 adds stability to screen 10 and prevents hourglassing.

Figures 12, 12A:
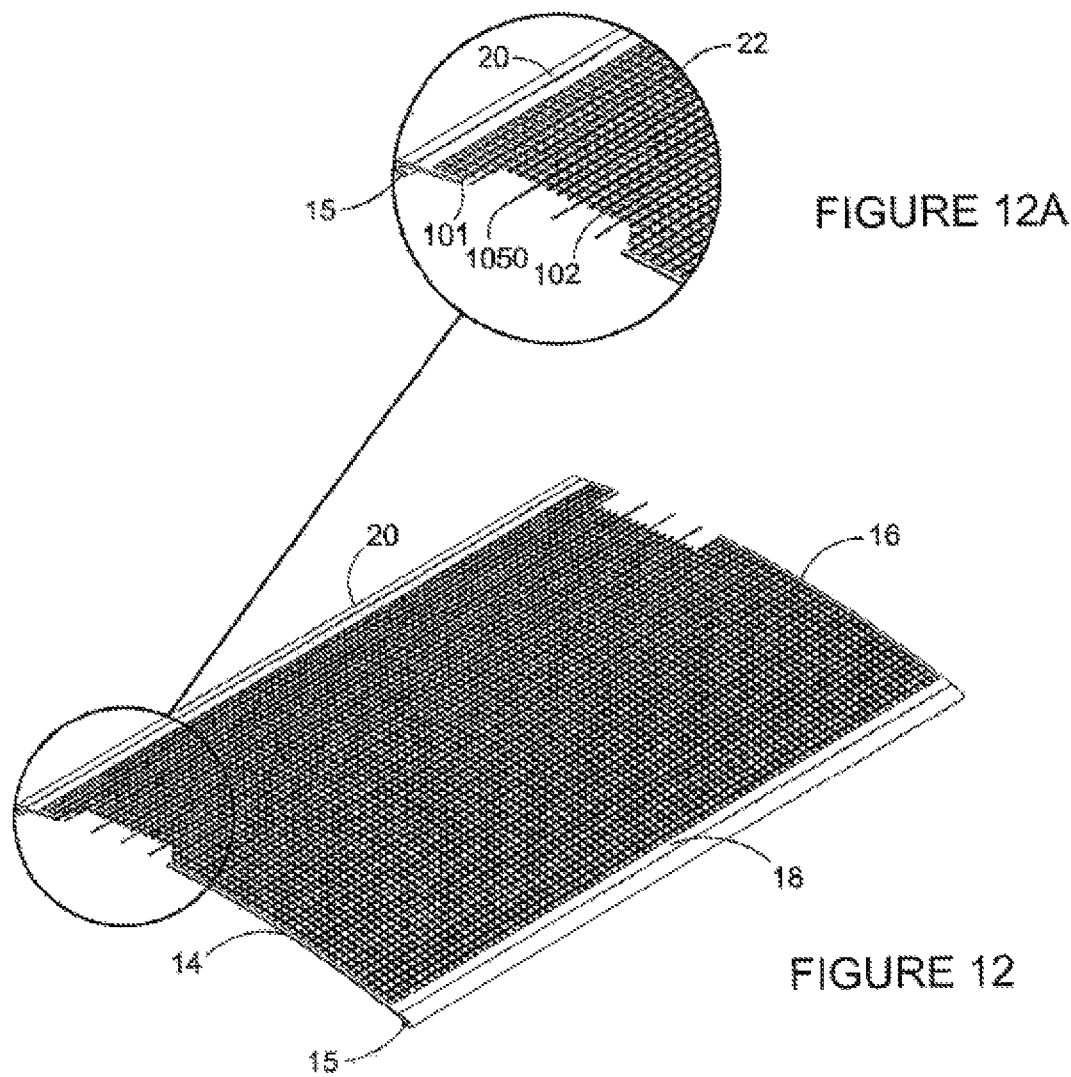
FIG. 12 is a top isometric view of a vibratory screen with a portion of the screen removed showing reinforcement rods according to an exemplary embodiment of the present invention.
FIG. 12A is an enlarged top isometric view of a portion of the screen shown in FIG. 12.

FIG. 1A shows an exemplary embodiment of the present inventions having first and second members 101, 102 forming screen openings 26 and members 203, 204 forming a support grid structure for openings 26. As shown in FIG. 1A, screen 10 does not include fifth and sixth members 305, 306. FIGS. 12 and 12A show another exemplary embodiment of the present invention having reinforcement rods 1050 integrally molded therein. As shown in FIGS. 12 and 12A, reinforcement rods 1050 are integrally molded into fourth members 204. Reinforcement rods 1050 may also be integrally molded into sixth members 306 or other members running parallel to members 204 and 306.

In use, the vibratory screen 10 is mounted on a vibratory screening machine 30 (FIG. 8) in the well known manner. More specifically, it is mounted on the screen deck bed 31 which is mounted on the frame (not shown) of the machine. The screen deck bed 31 includes spaced substantially parallel frame members 32 secured to each other by spaced substantially parallel cross frame members (not shown). Extending transversely between the cross frame members are a plurality of substantially parallel stringers 33 which mount channel rubbers 34. Mounted on parallel frame members 32 are channel-shaped draw bars 35 having lower portions 36 which are received within side edge portions 14, 16. Draw bolts 37 draw bars 35 apart to thereby tension vibratory screen 10 with the required force. The foregoing type of screen deck bed is well known in the art. Screen 10 may be mounted to other vibratory screening machines and side edge portions 14, 16 may be configured in other shapes to accommodate different vibratory screening machines.

Figure 13:
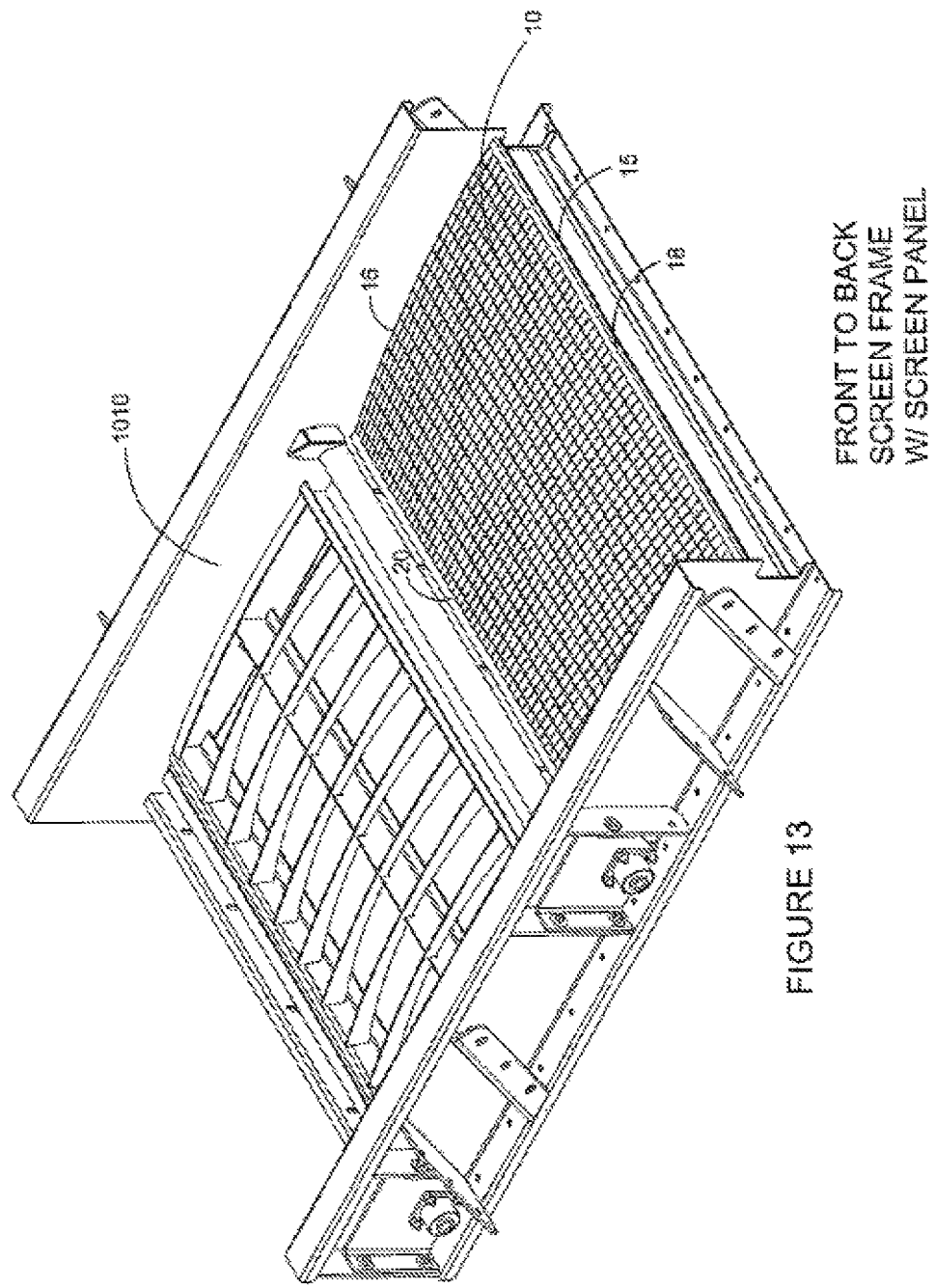
FIG. 13 is an isometric view of a portion of a vibratory screening machine having a vibratory screen installed thereon according to an exemplary embodiment of the present invention.

The embodiment shown in FIG. 13 is mounted front to back on vibratory screening machine 1010. In this embodiment, angle 15 is included in upper edge 20 and lower edge 18 and is below top surface 22. This embodiment has tension applied from underneath the screen rather than above and the tension is applied from front to back.

Figure 14:
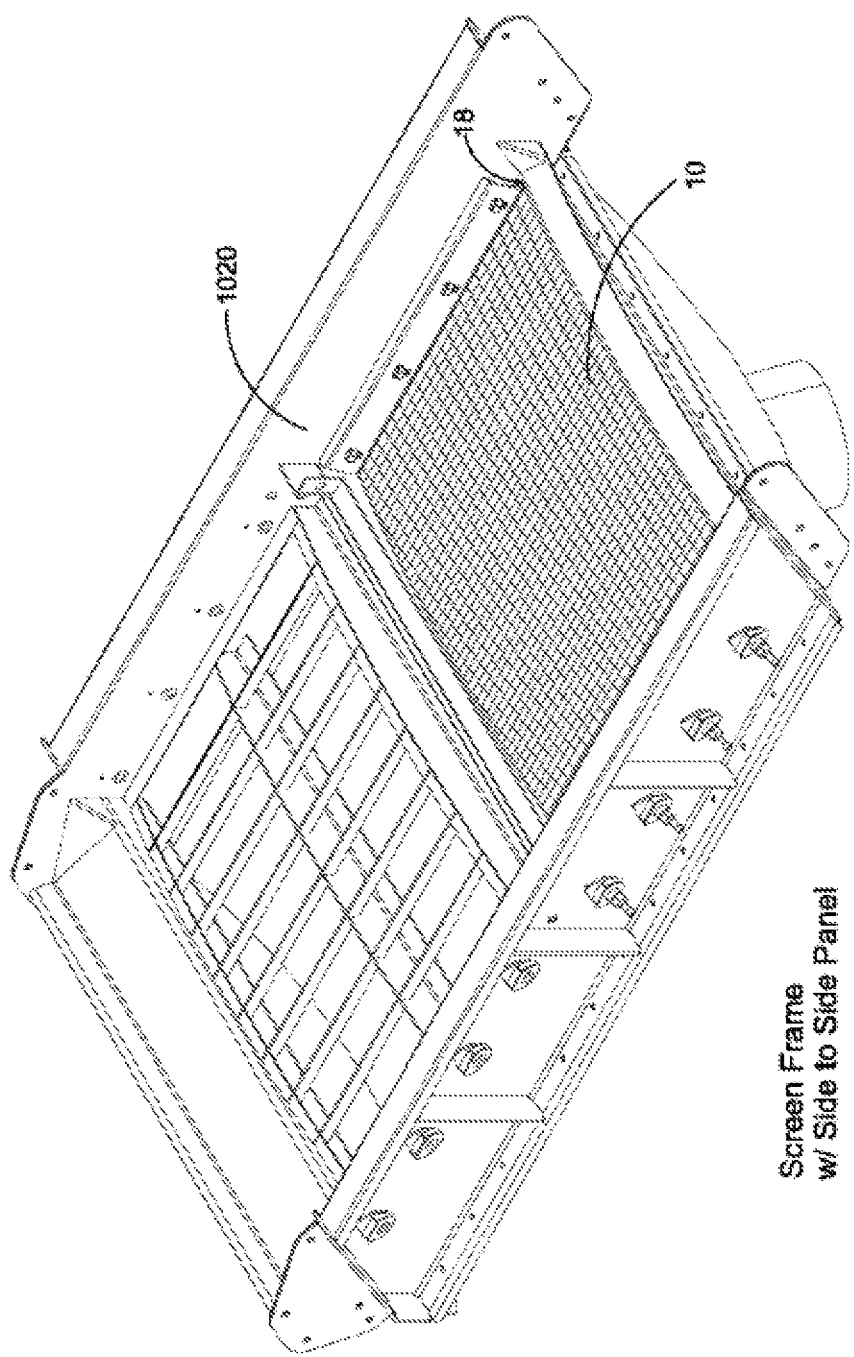
FIG. 14 is an isometric view of a portion of a vibratory screening machine having a vibratory screen installed thereon according to an exemplary embodiment of the present invention.

FIG. 14 shows an embodiment having angle 15 included in side edges 18, 20. This embodiment also has tension applied from above the screen and from side to side.

Figure 8:
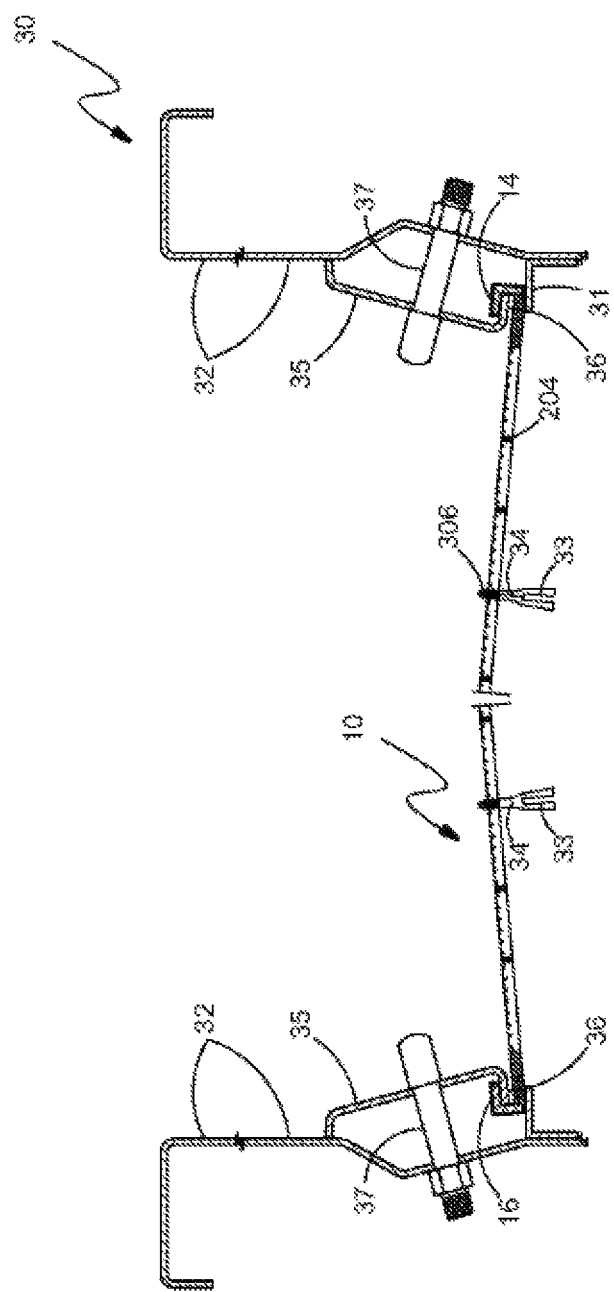
FIG. 8 is a fragmentary cross sectional view showing the manner in which the improved screen of FIG. 1 is mounted in a vibratory screening machine.

Reinforcement members 50 as described herein may be an aramid fiber (or individual filaments thereof), a naturally occurring fiber or others material having relatively large tensile strengths with relatively small cross sectional areas. When an aramid fiber is used as reinforcement fiber 50 it may be aramid fibers that are commercially obtainable under the trademark KEVLAR of the DuPont Company and further identified by the designation KEVLAR 29. The reinforcement members 50 may also be at least one of aramid fibers that are commercially obtainable under the trademarks TWARON, SULFRON, TEIJINCONEX, and TECHNORA of the Teijin Company. In addition, the aramid fibers may be twisted or woven multistrand so that they act as nature of wicks to absorb the polyurethane which is molded around them to thereby provide an extremely good bond therewith. The twisted or a woven multistrand fibers may be about 55 denier to about 2840 denier, preferably approximately 1500 denier. The flexibility of the aramid fibers provides a flexible reinforcement system for the molded polyurethane which is able to return to its original molded shape after the necessary bending and flexing that occurs during handling and installation into the vibratory frame member 32. Furthermore, flexible aramid fibers permit the flexible polyurethane screen to be flexed without harm into an arcuate condition and tensioned as shown in FIGS. 8, 13 and 14. Reinforcement members 50 may be tensioned before polyurethane is molded around them. Various configurations of reinforcement members 50 may be provided in any one of the first, second, third, fourth, fifth and sixth members 101, 102, 203, 204, 305, 306. Each member may include zero, one or more reinforcement members 50 and the reinforcement members 50 may be of different sizes and materials. Reinforcement members 50 may be located in the bottom halves of the members so as not to be exposed relatively early as the upper surface of the screen wears.

During operation, first members 101 will vibrate to enhance the screening action. In this regard, it is to be noted that because first members 101 are flexible and relatively thin they will provide a relatively high amplitude of desirable vibration. The reason the first members 101 can be made relatively thin, creating screen openings described herein, is because of a support framework of bi-directional support members and reinforcement members, as described herein, having relatively large tensile strengths with relatively small cross sectional areas. The making of the support members and the first members 101 relatively thin results in the screen having a greater percentage of open area, which, in turn, increases its capacity.

According to an exemplary embodiment of the present invention a vibratory screen 10 includes a flexible molded polyurethane body 12 having substantially parallel side edge portions 14, 16 at opposite ends of body 12, a lower edge portion 18 substantially perpendicular to the side edge portions 14, 16, an upper edge portion 20 substantially perpendicular to the side edge portions 14, 16 and opposite the lower edge portion 18, an upper surface 22, a lower surface 24, first and second members 101, 102 forming screening openings 26, the first members 101 extending between the side edge portions 14, 16 and the second members 102 extending between the lower edge portion 18 and the upper edge portion 20. The body may also includes third and fourth members 203, 204. Third and fourth members 203 and 204 may have a thickness greater than the first and second members 101, 102. Third members 203 are substantially parallel and extend transversely between the side edge portions 14, 16 and have multiple first members 101 therebetween. Fourth members 204 are substantially parallel and extend transversely between the lower edge portion 18 and the upper edge portion 20 and have multiple second members 102 therebetween. Reinforcement members 50 may be molded integrally with the third and/or fourth members 203, 204. Reinforcement rods 1050 may be molded integrally with fourth members 204. The body also includes fifth and sixth members 305, 306. Fifth members 305 are substantially parallel and extending transversely between the side edge portions 14, 16. Sixth members 306 are substantially parallel and extending transversely between the lower edge portion 18 and the upper edge portion 20. The fifth and sixth members have a thickness greater than the third and fourth members and include reinforcement members 50 molded integrally therewith. Reinforcement rods 1050 may be molded integrally with the sixth members 306. Vibratory screens according to this configuration may have open screening areas greater than forty percent and mesh sizes ranging from approximate 0.375 mesh to approximately 400 mesh. By way of example, screens tested having the aforementioned configuration include a 43 mesh size screen, a 140 mesh size screen and a 210 mesh size screen. Each of these screens had open screening areas of approximately 40 percent to approximately 46 percent. Such large screening areas for such fine mesh sizes are achieve through the relatively strong and thin grid framework created by the third, fourth, fifth and sixth members, 203, 204, 305, 306 and reinforcement members molded integrally therewith. In the aforementioned exemplary embodiment and examples, the size of each grid unit formed by the intersection of the third and fourth members, 203 and 204 is approximately 1" by 1". Generally, grid units may be larger for screens with larger screen openings and grid units are smaller for screens with smaller screen openings. This principle may be generally applicable for each example embodiment discussed herein. Grid units may also have a generally rectangular shape or any other suitable shape for supporting the screen openings.

According to an exemplary embodiment of the present invention, a method of making a vibratory screen, includes: creating a mold configured to fabricate the vibratory screen, the vibratory screening having a flexible molded polyurethane body; installing reinforcement members in the mold, the reinforcement members configured to be molded integrally with the body; installing reinforcement rods in the mold, the reinforcement rods configured to be molded integrally with the body, filling the mold with polyurethane; and forming the vibratory screen that has: substantially parallel side edge portions at opposite ends of the body, a lower edge portion substantially perpendicular to the side edge portions, an upper edge portion substantially perpendicular to the side edge portions and opposite the lower edge portion, an upper surface, a lower surface, first and second members forming screening openings, the first members extending between the side edge portions and the second members extending between the lower edge portion and the upper edge portion, third and fourth members, the reinforcement rods molded integrally with at fourth members, the third members substantially parallel and extending transversely between the side edge portions and having multiple first members therebetween, the fourth members substantially parallel and extending transversely between the lower edge portion and the upper edge portion and having multiple second members therebetween, reinforcement members molded integrally with at least one of the first and second members.

According to exemplary embodiments of the present invention, the screens described herein may be modified for use in various attrition screening applications, including for use in attrition screening devices such as sifters, gyratory sifters, graters, or similar machines that may be configured to implement motion to the screen such as oscillatory, gyratory, gyratory reciprocating, fully gyratory, rotary, planar, or other type of motion or combinations thereof.

While preferred embodiments of the present invention have been disclosed, it will be appreciated that it is not limited thereto but may be otherwise embodied within the scope of the following claims.

What is claimed is:

1. A vibratory screen comprising: a flexible molded polyurethane body having substantially parallel side edge portions at opposite ends of the body, a lower edge portion transversely disposed between the side edge portions, an upper edge portion disposed between the side edge portions and substantially parallel and opposite to the lower end portion, an upper surface, a lower surface, a first integrally molded grid structure, a second integrally molded grid structure, a third integrally molded grid structure and screen openings, wherein the first grid structure includes first and second members forming the screening openings, the first members substantially parallel and extending transversely between the side edge portions and the second members substantially parallel and extending transversely between the lower edge portion and the upper edge portion, wherein the second grid structure includes third and fourth members, the third members substantially parallel and extending transversely between the side edge portions and having multiple first members therebetween, the fourth members substantially parallel and extending transversely between the lower edge portion and the upper edge portion and having multiple second members therebetween, wherein the third grid structure includes fifth and sixth members, the fifth members substantially parallel and extending transversely between the side edge portions and having multiple third members therebetween, the sixth members substantially parallel and extending transversely between the lower edge portion and the upper edge portion and having multiple fourth members therebetween, wherein reinforcement members are molded integrally with at least one of the first, third, and fifth members and at least one of the second, fourth, and sixth members.

2. The vibratory screen of claim 1, wherein the first members include reinforcement members molded integrally therewith, the reinforcement members having a thickness in the range of about 0.006 inches to about 0.015 inches.

3. The vibratory screen of claim 1, wherein the second members include reinforcement members molded integrally therewith, the reinforcement members having a thickness in the range of about 0.006 inches to about 0.015 inches.

4. The vibratory screen of claim 1, wherein the openings are about 0.044 mm to about 4 mm between inner surfaces of the first members and about 0.044 mm to about 60 mm between inner surfaces of the second members.

5. The vibratory screen of claim 1, wherein the reinforcement members are molded integrally with the first and second members.

6. The vibratory screen of claim 5, wherein the first members include reinforcement members molded integrally therewith, the reinforcement members having a thickness in the range of about 0.006 inches to about 0.015 inches, and wherein the second members include reinforcement members molded integrally therewith, the reinforcement members having a thickness in the range of about 0.015 inches to about 0.040 inches.

7. The vibratory screen of claim 5, wherein the reinforcement members are at least one of an aramid fiber and naturally occurring fiber.

8. The vibratory screen of claim 5, wherein the reinforcement members are aramid fibers that are at least one of a twisted multistrand and a woven multistrand and wherein the polyurethane impregnates the multistrand forming a bond between the first member and the fiber therein and a bond between the second member and the fiber therein.

9. The vibratory screen of claim 5, wherein reinforcement rods are molded integrally with at least one of the fourth and sixth members.

10. The vibratory screen of claim 9, wherein the reinforcement rods are at least one of a plastic, a metal and a polymer.

11. The vibratory screen of claim 1, wherein the reinforcement members are molded integrally with the third and fourth members.

12. The vibratory screen of claim 1, wherein the reinforcement members are aramid fibers that are at least one of a twisted and a woven multistrand, wherein the fibers are about 55 denier to about 2840 denier.

13. The vibratory screen of claim 11, wherein reinforcement rods are molded integrally with at least one of the fourth and sixth members.

14. The vibratory screen of claim 1, wherein the reinforcement members are molded integrally with the fifth and sixth members.

15. The vibratory screen of claim 14, wherein the reinforcement members are least one of an aramid fiber and naturally occurring fiber.

16. The vibratory screen of claim 14, wherein reinforcement rods are molded integrally with at least one of the fourth and sixth members.

17. The vibratory screen of claim 16, wherein the reinforcement rods are at least one of a plastic, a metal and a polymer.

18. The vibratory screen of claim 1, wherein the screen has an open screening area greater than forty percent.

19. The vibratory screen of claim 1, wherein the side edge portions are configured to be tensioned on at least one of a vibratory screening machine and an attrition screening device.

20. A method of making a vibratory screen, comprising:
creating a mold configured to fabricate the vibratory screen, the vibratory screen having a flexible molded polyurethane body;
installing reinforcement members in the mold, the reinforcement members configured to be molded integrally with the body;
installing reinforcement rods in the mold, the reinforcement rods configured to be molded integrally with the body
filling the mold with polyurethane; and
forming the vibratory screen, the vibratory screen having substantially parallel side edge portions at opposite ends of the body, a lower edge portion substantially perpendicular to the side edge portions, an upper edge portion substantially perpendicular to the side edge portions and opposite the lower edge portion, an upper surface, a lower surface, first and second members forming screening openings, the first members extending between the side edge portions and the second members extending between the lower edge portion and the upper edge portion, third members substantially parallel and having multiple first members therebetween, fourth members substantially parallel and having multiple second members therebetween.

21. The method of claim 20, wherein the first members include reinforcement members molded integrally therewith, the reinforcement members having a thickness in the range of about 0.006 inches to about 0.015 inches.

22. The method of claim 20, wherein the second members include reinforcement members molded integrally therewith, the reinforcement members having a thickness in the range of about 0.015 inches to about 0.040 inches.

23. The method of claim 20, wherein the openings are about 0.044 mm to about 4 mm between inner surfaces of the first members and about 0.044 mm to about 60 mm between inner surfaces of the second members.

24. The method of claim 20, wherein the reinforcement members are molded integrally with the first and second members.

25. The method of claim 24, wherein the first members include reinforcement members molded integrally therewith, the reinforcement members having a thickness in the range of about 0.006 inches to about 0.015 inches, and wherein the second members include reinforcement members molded integrally therewith, the reinforcement members having a thickness in the range of about 0.015 inches to about 0.040 inches.

26. The method of claim 24, wherein the reinforcement rods are molded integrally with the fourth members.

27. The method of claim 20, wherein the reinforcement members are molded integrally with the third and fourth members.

28. The method of claim 20, wherein the reinforcement members are aramid fibers that are at least one of a twisted and a woven multistrand, wherein the fibers are about 55 denier to about 2840 denier.

29. The method of claim 27, wherein the reinforcement rods are molded integrally with the fourth members.

30. A vibratory screen, comprising: a flexible molded polyurethane body, screen openings in the body, first substantially parallel flexible members defining opposite sides of the screen openings, second substantially parallel flexible members defining opposite sides of the screen openings, the first members substantially perpendicular to the second members, third members substantially parallel and having multiple first members therebetween, fourth members substantially parallel and having multiple second members therebetween, side edge portions substantially parallel at opposite sides of the body between which the third members therein extend, first and second end portions substantially parallel at opposite ends of the body between which the fourth members therein extend, the side portions substantially perpendicular to the end portions, wherein the reinforcement members are molded integrally with at least one of the first and third members and at least one of the second and fourth members.

31. The vibratory screen of claim 30, wherein the first members include reinforcement members molded integrally therewith, the reinforcement members having a thickness in the range of about 0.006 inches to about 0.015 inches.

32. The vibratory screen of claim 30, wherein the second members include reinforcement members molded integrally therewith, the reinforcement members having a thickness in the range of about 0.015 inches to about 0.040 inches.

33. The vibratory screen of claim 30, wherein the openings are about 0.044 mm to about 4 mm between inner surfaces of the first members and about 0.044 mm to about 60 mm between inner surfaces of the second members.

34. The vibratory screen of claim 30, wherein the reinforcement members are molded integrally with the first and second members.

35. The vibratory screen of claim 34, wherein the first members include reinforcement members molded integrally therewith, the reinforcement members having a thickness in the range of about 0.006 inches to about 0.015 inches, and wherein the second members include reinforcement members molded integrally therewith, the reinforcement members having a thickness in the range of about 0.015 inches to about 0.040 inches.

36. The vibratory screen of claim 34, wherein reinforcement rods are molded integrally with the fourth member.

37. The vibratory screen of claim 30, wherein the reinforcement members are aramid fibers that are at least one of a twisted and a woven multistrand, wherein the fibers are about 55 denier to about 2840 denier.

38. The vibratory screen of claim 37, wherein reinforcement rods are molded integrally with the fourth member.

39. The vibratory screen of claim 30, wherein the side edge portions are configured to be tensioned on at least one of a vibratory screening machine and an attrition screening device.

40. The vibratory screen of claim 30, wherein the reinforcement members are molded integrally with the third and fourth members.

* * * * *